O. W. THOMAS.
COMBINATION HOSE COUPLING AND VALVE.
APPLICATION FILED MAR. 27, 1909.
1,000,642.
Patented Aug. 15, 1911.
2 SHEETS—SHEET 1.
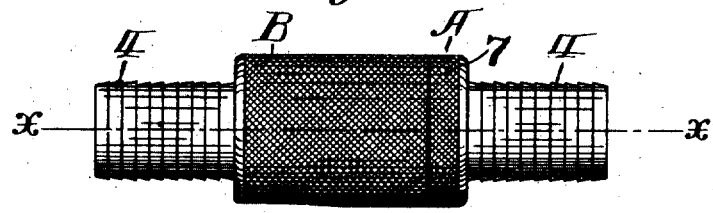
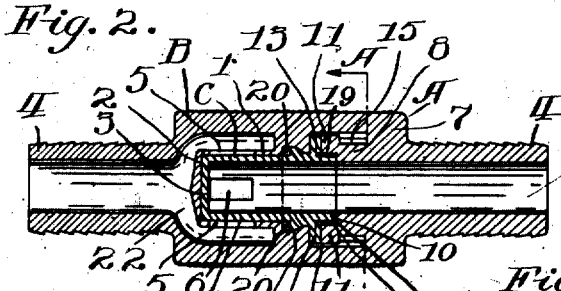
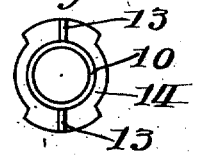
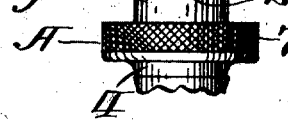
Witnesses:
R. A. Fischer
F. C. Caswell
Inventor:
Owen W. Thomas,
by: John E. Stryker
His Attorney.

O. W. THOMAS.
COMBINATION HOSE COUPLING AND VALVE.
APPLICATION FILED MAR. 27, 1909.
1,000,642.
Patented Aug. 15, 1911.
2 SHEETS—SHEET 2.
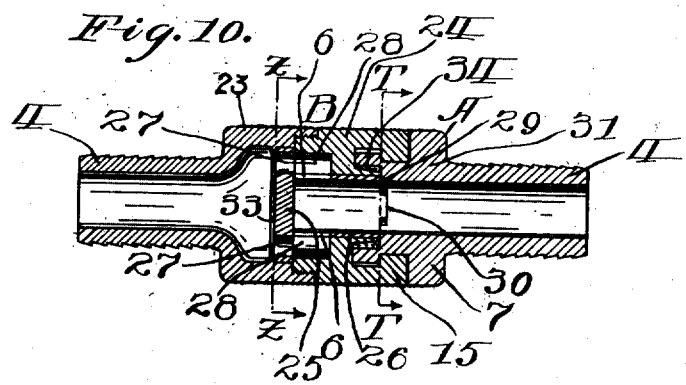
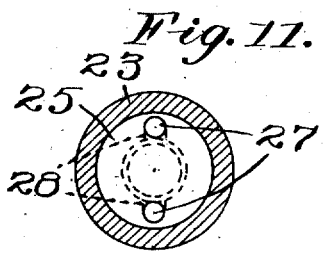
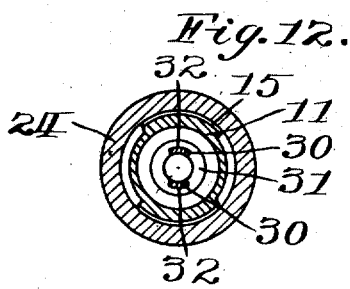
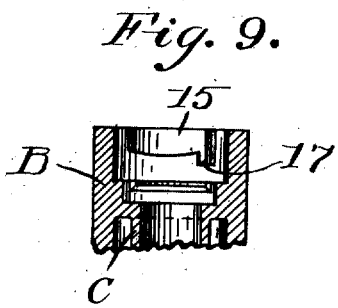
Witnesses:
P. A. Fischer
F. C. Caswell
Inventor:
Owen W. Thomas,
by: John E. Stryker
His Attorney.

UNITED STATES PATENT OFFICE.

OWEN W. THOMAS, OF ST. PAUL, MINNESOTA, ASSIGNOR OF ONE-HALF TO GUSTAVE F. KREISEL, OF HENNEPIN COUNTY, MINNESOTA.

COMBINATION HOSE COUPLING AND VALVE.

1,000,642.  Specification of Letters Patent.  Patented Aug. 15, 1911.

Application filed March 27, 1909. Serial No. 486,122.

*To all whom it may concern:*

Be it known that I, OWEN W. THOMAS, a citizen of the United States, residing at St. Paul, in the county of Ramsey and State of Minnesota, have invented new and useful Improvements in a Combination Hose Coupling and Valve, of which the following is a specification.

My invention relates to a combination hose coupling and valve adapted for use with pneumatic tools, air brakes, fire hose, and for similar connections.

It has for its object to provide an efficient coupler, by the use of which the ports of the valve will be opened when the coupling is made, and closed by the act of uncoupling the sections. In other words, the device is adapted for use in coupling sections of hose or pipe which convey air or water under pressure so that the discharge of the fluid may be uninterrupted when the sections are united, and cut off when said sections are disconnected.

In the drawings Figure 1 is a side-elevation of my improved coupling; Fig. 2 is a longitudinal section taken on the line X—X of Fig. 1; Fig. 3 is a view taken on the line A—A of Fig. 2 looking in the direction of the arrows; Fig. 4 is a detail partly broken away of one of the boxes of the coupling; Fig. 5 is a plan view of Fig. 4; Fig. 6 is a detail view of the plug of the valve; Fig. 7 is a plan view of the plug from below; Fig. 8 is a plan view of the plug from above; Fig. 9 is a cross section partly broken away of Fig. 3 taken on the line Y—Y; Fig. 10 is a horizontal central section of an alternate construction; Fig. 11 is a section of Fig. 10 taken on the line Z—Z, and Fig. 12 is a section of Fig. 10 taken on the line T—T.

My coupling consists of the open box or ring A and the box B, the latter being integral with the thimble 1 which is closed at its breech 2. The thimble 1 forms the casing for the tubular valve plug C, which is likewise closed at its breech 3. Each box is provided with an extension 4, of diminished diameter, corrugated to connect with a length of hose and the external surface of larger diameter is knurled as shown in Fig. 1. The peripheral wall of the thimble or valve casing 1 is perforated by orifices 5, while the wall of the cylindrical plug C is formed with apertures 6 corresponding in position with the orifices 5 in the casing.

The plug is rotatable in the casing so that when in one position its apertures coincide with the orifices of the casing, while when revolved a quarter turn its apertures are brought under the blank parts of the casing, when the stop cock formed by the plug C and the casing 1 is closed. By the connecting mechanism hereinafter described these revolutions of the plug are so coördinated that the act of uncoupling the hose closes the valve, and coupling opens it. The coupling box A is formed with a collar 7 from which the sleeve 8 extends, having at its extremity an enlarged bore 9 adapted to freely receive the nipple 10 of the plug C. Oppositely arranged shoulders 10ª on the valve plug C are adapted to fit in the groove 10ᵇ in the coupling box B when the boxes A and B are separated to hold said plug C in position in the casing 1. The sleeve 8 is also provided with oppositely arranged bosses 11 whose outer arcs correspond with the inner diameter of the coupling end of the box B. These bosses have peripheral recesses 12 into which two corresponding lugs 13 on the face 14 of the plug C are received, thus when in normal position locking together the plug C and the box A. This construction permits the bosses 11 on the sleeve 8 to enter and revolve within the box B and in order that they may be held therein, inwardly projecting peripheral flanges 15 are arranged diametrically opposite at the entrance to the bore 16 of said box, so that in coupling the hose the bosses 11 of the box A pass between said flanges 15 and when the recesses 12 have been adjusted over the lugs 13 on the plug C a quarter turn of the coupling will bring the bosses 11 under said flanges 15 and complete the coupling. Studs 17 project from beneath the flanges 15 and nicks 18 are cut in the bosses 11 so that after a quarter turn of the coupling a stop is formed by said lugs and nicks to prevent further turning of the parts and insure complete opening and closing of the valve ports. The plug C is held in its seat by flanges in the bore of the box B beneath the flanges 15, which co-act with bosses on the periphery of the plug. Packing rings 19 and 20 insure a perfectly tight connection of the parts A, B and C. The box B is cored out at 22 to form an annular passage way about the thimble 1 and thus give access to the ports of the valve. The lower surfaces 21 of the bosses 11 are slightly concave and the contacting surfaces of the flanges 15 are correspondingly crowned to secure a firm connection between the boxes.

In the alternate construction shown in Fig. 10, the box B is made in two parts 23 and 24. The rotary valve member consists of a disk 25 carried by the cylindrical stem 26 with which it is made integral. As in the case of the plug in the preferred construction, this stem 26 is provided with peripheral apertures 6. The disk 25 is also provided with circular orifices 27 and the casing 24 is formed with peripheral recesses 28. The disk, through its cylindrical stem, is seated and revoluble in the casing 24. When the valve is in the position shown in Fig. 10 the orifices 27 of the disk register with the recesses 28, and they in turn with the peripheral apertures 6 in the stem 26. When the valve is given a quarter turn the blank surfaces of the disk, as well as that of the cylinder, are over the recesses 28 and the ports are closed. The stem 26 is formed at its open end 29 with peripheral bosses 30, and the sleeve 31 of the box A is recessed at 32 to correspond with the form of the bosses 30. When the coupling is made between the boxes A and B the bosses 30 are received in the recess 32, and, with the connection thus formed, a quarter turn of the coupling opens the valve as shown in Fig. 10, while the reverse movement closes it in the act of uncoupling. A flanged projection 33 is formed on the inner periphery of the casing 23 to prevent lateral movement of the disk 25. The means for holding the boxes A and B together and for preventing more than a quarter turn of the valve in coupling and uncoupling are substantially the same as those shown in the preferred construction. The packing 34 insures a tight connection between the boxes A and B.

Having described my invention, what I claim as new and desire to protect by Letters Patent, is:

1. A combined hose coupling and valve, comprising an open coupling box, a coupling box formed with a grooved thimble having peripheral orifices and a rotatable cylindrical plug provided with peripheral apertures adapted to register with said orifices, shoulders on said plug, said plug being seated in said thimble and detachably connected thereto through said grooves and shoulders, means comprising flanges and bosses carried by the contiguous faces of the boxes for locking the same together, means for detachably connecting the plug with the open box whereby a quarter turn will open or close the valve and a stop limiting the movement of the boxes to insure complete registration of said apertures and orifices.

2. A combined hose coupling and valve, comprising only three pieces, viz: an open coupling box, a coupling box formed with a thimble having peripheral orifices and a rotatable cylindrical plug provided with peripheral apertures, adapted to register with said orifices, said plug being seated in said thimble, means comprising flanges and bosses carried by the contiguous faces of the boxes for locking the same together, and for holding the plug in its seat, and means for detachably connecting the plug with the open box whereby a quarter turn will open or close the valve.

3. A combined hose coupling and valve, comprising an open coupling box, a coupling box formed with a valve casing having peripheral orifices, a rotatable cylindrical plug seated in said casing and provided with peripheral apertures adapted to register with said orifices, means for securing the plug in its seat when said open coupling box is removed, means comprising flanges and bosses carried by the contiguous faces of the boxes for locking the same together, means for detachably connecting the plug with the open box whereby a quarter turn will open the valve when a coupling is made and close it when the boxes are disconnected and a stop on one of said flanges to engage one of said bosses said stop limiting the movement of the boxes to one quarter of a turn.

4. A combined hose coupling and valve, comprising an open coupling box, a coupling box formed with a thimble having diametrically opposed peripheral orifices and a rotatable cylindrical plug provided with similarly arranged peripheral apertures seated in said thimble, means consisting of flanges and bosses made integral with the inner, contiguous faces of the boxes for locking the same together and securing said plug in said thimble, means for detachably connecting the plug with the open box whereby a quarter turn will open or close the valve and a stop to limit the movement of said open box relative to said coupling box.

In testimony whereof, I have signed my name to this specification in the presence of the subscribing witnesses.

OWEN W. THOMAS.

Witnesses:
H. H. FLOR,
J. E. STRYKER.